United States Patent
Kushalnagar et al.

(10) Patent No.: US 8,085,695 B2
(45) Date of Patent: Dec. 27, 2011

(54) BOOTSTRAPPING DEVICES USING AUTOMATIC CONFIGURATION SERVICES

(75) Inventors: Nandakishore Kushalnagar, Portland, OR (US); Mousumi Hazra, Beaverton, OR (US); Jasmeet Chharba, Hillsboro, OR (US); Lakshman Krishnamurthy, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 633 days.

(21) Appl. No.: 11/043,478

(22) Filed: Jan. 25, 2005

(65) Prior Publication Data
US 2006/0168167 A1 Jul. 27, 2006

(51) Int. Cl.
*H04B 7/00* (2006.01)

(52) U.S. Cl. ........ 370/310; 455/517; 455/405; 455/574; 455/411; 455/41.1; 455/435.1; 455/575.1; 455/518; 709/223; 709/220; 709/250; 709/709; 709/713; 709/150; 709/151; 370/236; 370/389; 370/238; 370/388; 370/411

(58) Field of Classification Search ........... 709/208, 709/250, 238, 220, 223, 709, 713, 150, 151, 709/203, 221, 227; 455/517, 405, 574, 41.3, 455/343.1, 518, 411, 41.1, 435.1, 575.1, 455/410; 713/153, 151, 150; 379/114.01, 379/106.08, 111; 370/338, 401, 236, 389, 370/238, 388
See application file for complete search history.

(56) References Cited

U.S. PATENT DOCUMENTS

| | | | |
|---|---|---|---|
| 6,012,100 A * | 1/2000 | Frailong et al. | 709/250 |
| 6,684,336 B1 * | 1/2004 | Banks et al. | 709/227 |
| 6,697,649 B1 * | 2/2004 | Bennett et al. | 455/574 |
| 6,760,416 B1 * | 7/2004 | Banks et al. | 379/114.01 |
| 7,113,962 B1 * | 9/2006 | Kee et al. | 707/201 |
| 7,327,683 B2 * | 2/2008 | Ogier et al. | 370/236 |
| 2002/0094799 A1 * | 7/2002 | Elliott et al. | 455/405 |
| 2003/0018889 A1 * | 1/2003 | Burnett et al. | 713/153 |
| 2004/0116140 A1 * | 6/2004 | Babbar et al. | 455/517 |
| 2004/0203592 A1 * | 10/2004 | Kermode et al. | 455/411 |
| 2004/0230664 A1 * | 11/2004 | Bowers et al. | 709/208 |
| 2005/0160138 A1 * | 7/2005 | Ishidoshiro | 709/203 |
| 2005/0195075 A1 * | 9/2005 | McGraw et al. | 340/500 |
| 2005/0266826 A1 * | 12/2005 | Vlad | 455/410 |
| 2006/0133332 A1 * | 6/2006 | Achanta | 370/338 |
| 2006/0159083 A1 * | 7/2006 | Ward et al. | 370/389 |
| 2006/0248369 A1 * | 11/2006 | Kumazawa et al. | 714/4 |
| 2006/0259958 A1 * | 11/2006 | Jennings et al. | 726/6 |

* cited by examiner

*Primary Examiner* — Rafael Pérez-Gutiérrez
*Assistant Examiner* — Joseph Arévalo
(74) *Attorney, Agent, or Firm* — Blakely, Sokoloff, Taylor & Zafman LLP

(57) ABSTRACT

The present disclosure relates to attempting to automatically configure an unconfigured device utilizing a previously configured device and, more specifically, to attempting to bootstrap a universal plug-and-play (UPnP) access point utilizing a previously configured access point.

8 Claims, 2 Drawing Sheets

BOOTSTRAPPING DEVICES USING AUTOMATIC CONFIGURATION SERVICES

BACKGROUND

1. Field

The present disclosure relates to attempting to automatically configure an unconfigured device utilizing a previously configured device and, more specifically, to attempting to bootstrap a universal plug-and-play (UPnP) access point utilizing a previously configured access point.

2. Background Information

Typically, wireless networks are arranged in a hub-and-spoke fashion. In this topology, a single access point (AP) acts as a central point through which all network packets are routed. A number of clients communicate with each other and any other networks via the access point. Hence, it may be said that the access point acts as a hub, while the clients form spokes originating from the hub.

As wireless networks evolve, it is expected that wireless networks may include multiple access points. Typically, these networks may be referred to as "meshed wireless local area networks." In one configuration the multiple access points may be used to increase the range of the wireless network. However, other configurations are possible.

Typically, each access point in a wireless mesh network must be substantially identically configured. This is because, under the existing common wireless scheme, all access points must communicate with the clients utilizing the same channel, service set identifier (SSID), etc. If the access points are configured differently, the clients will view each access point as belonging to a different network as opposed to a large, sprawling single network.

Currently, the configuration for each access point is a manual process. This manual process is often cumbersome and error prone. It is expected that some users may find the process daunting. A need therefore exists to address at least these problems.

BRIEF DESCRIPTION OF THE DRAWINGS

Subject matter is particularly pointed out and distinctly claimed in the concluding portions of the specification. The claimed subject matter, however, both as to organization and the method of operation, together with objects, features and advantages thereof, may be best understood by a reference to the following detailed description when read with the accompanying drawings in which:

DETAILED DESCRIPTION

In the following detailed description, numerous details are set forth in order to provide a thorough understanding of the present claimed subject matter. However, it will be understood by those skilled in the art that the claimed subject matter may be practiced without these specific details. In other instances, well-known methods, procedures, components, and circuits have not been described in detail so as to not obscure the claimed subject matter.

Figure 1:
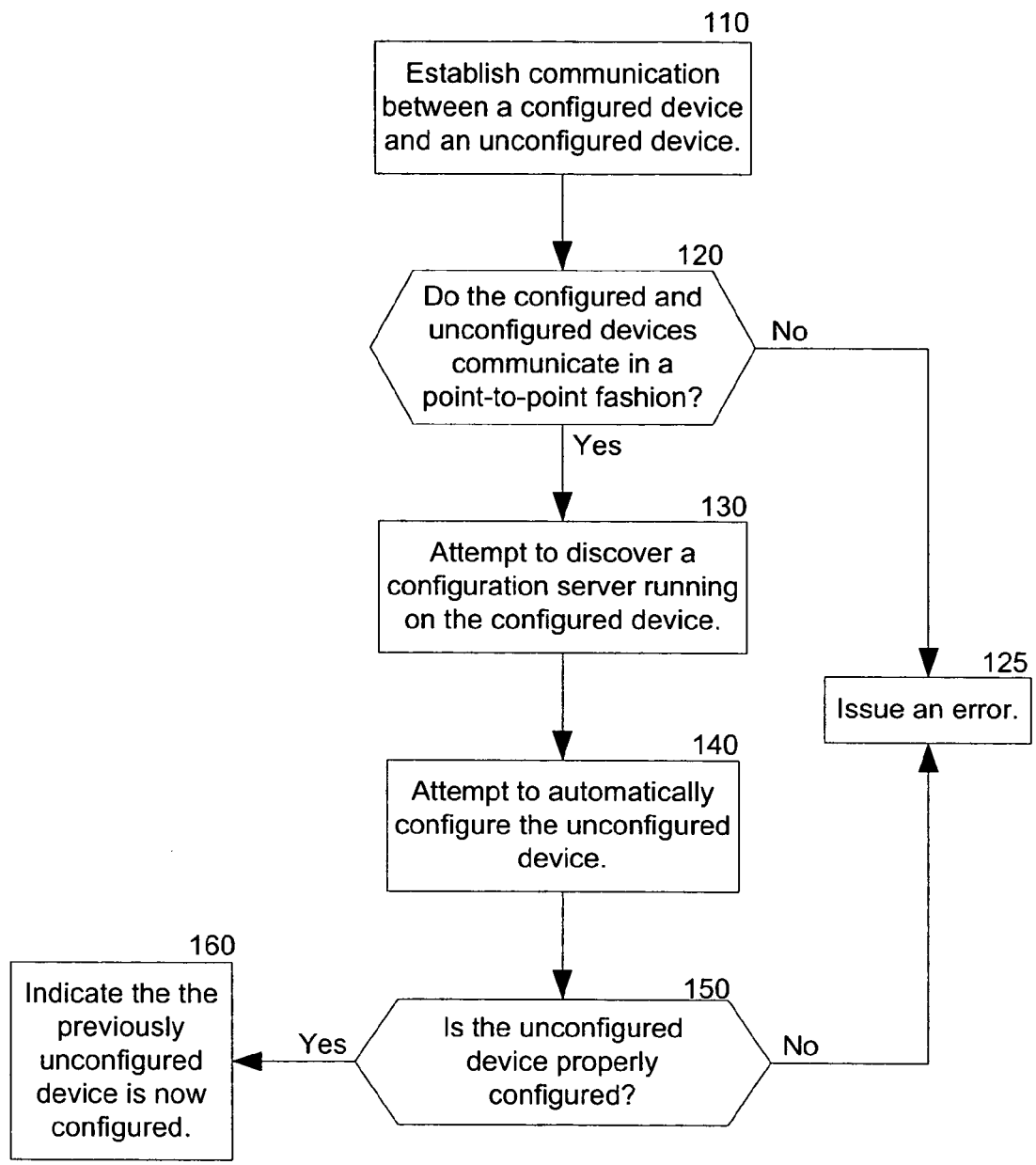
FIG. 1 is a flow chart illustrating an embodiment of a technique for attempting to automatically configure an unconfigured device utilizing a previously configured device.

FIG. 1 is a flow chart illustrating an embodiment of a technique for attempting to automatically configure an unconfigured device utilizing a previously configured device. Block 110 illustrates that, in one embodiment, communication may be established between a configured device and an unconfigured device. In one embodiment, the devices may be, for example, devices such as wireless access points, multimedia centers, voice over internet protocol (VoIP) telephones, routers, laptops, client devices, etc. In another embodiment, the devices may communicate via a protocol substantially compliant with the Universal Plug-and-Play (UPnP) protocol. In yet another embodiment, the communication may occur via a wireless or wired interface. In another embodiment, the devices may communicate using an out-of-band channel, which, depending on the embodiment, may or may not be secure.

In one specific illustrative example, the devices may be wireless local area network (WLAN) access points (APs). In this embodiment, both the configured and unconfigured access points may include an Ethernet port. The two access points may be physically connected utilizing these Ethernet ports via, for example, a crossover cable.

In this specific illustrative embodiment, these devices may then establish communication utilizing an UPnP protocol. In one embodiment, the UPnP protocol may be substantially compliant with the UPnP WLAN Access Point Device specification, and related and subsequent specifications (hereafter, "the UPnP AP specification family"). *WLAN Access Point Device* v1.0, UPnP Working Forum, Oct. 17, 2003. However, other embodiments are contemplated and are within the scope of the disclosed subject matter.

In this specific illustrative embodiment, the unconfigured device may request an IP address from a Dynamic Host Configuration Protocol (DHCP) server running on the configured device, or alternately, utilize the auto-IP address feature as specified in the UPnP protocol. However, this is merely one specific embodiment, and other embodiments are contemplated.

Block 120 illustrates that, in one embodiment, a determination may be made whether or not the two devices are communicating via a point-to-point fashion. In one embodiment, this may involve an actual point-to-point link. In another embodiment, the point-to-point link may be virtual, such as, for example, utilizing a virtual private network (VPN). The existence of point-to-point communication may, in one embodiment, be desirable to avoid mis-configuring other devices within the network. For example, if the configured and unconfigured devices are communicating via an intervening third device, a user may not wish the intervening third device to be inadvertently re-configured or mis-configured. In one embodiment, the determination may also include whether or not the communication between the two devices occurs in a secure fashion.

In the specific illustrative embodiment, from above, the detection of the point-to-point link may include a "touch" function) between the two devices (i.e. that the two devices are physically touching via a cable or other connection). In one specific embodiment, the two devices may detect the initial connectivity established by the crossover Ethernet cable, described above. Then the configured device may indicate that cable should be disconnected. In one embodiment, this indication may include a physical indicator, such as, for example, a flashing LED; however, other indications are within the scope of the disclosed subject matter. Upon disconnecting the cable, the configured device may detect the change in state, and indicate that the user should reconnect the cable. Once again this indication may take many forms. The configured device may then redetect the unconfigured device.

In one embodiment, this ability to connect, disconnect, and reconnect the two devices via a physical link within a short period of time may be considered sufficient indication that point-to-point communication exists between the two devices. However, other techniques for validating point-to-point communication are contemplated and within the scope of the disclosed subject matter.

Block 125 illustrates that, in one embodiment, if the existence of point-to-pint communication can not be validated, and error may be issued. In one embodiment, this may be done via a physical indicator, such as, for example, a LED on one or both of the devices. However, it is contemplated that embodiments exist where point-to-point communication is not necessary.

Block 130 illustrates that, in one embodiment, an attempt may be made by the unconfigured device to discover a configuration server running on the configured device. However, in another embodiment, the configuration server or service may detect the unconfigured device.

In the specific illustrative embodiment, the unconfigured access point may discover an UPnP WLAN Configuration service running on the configured access point. In this one embodiment, the service may provide the ability to configure access point configuration data, such as, for example, service set identifier (SSID), channel number, transmit power, etc. However, other embodiments that do not utilize or comply with the UPNP AP specification family are within the scope of the disclosed subject matter.

Block 140 illustrates that, in one embodiment, an attempt may be made to automatically configure the unconfigured device. In one embodiment, this may include a series of data requests to the configuration server. In another embodiment, only one request may be made. In an alternate embodiment, the configured device may push data to the unconfigured device.

In the specific example, the unconfigured device may request the data necessary to bootstrap the access point in a mesh network utilizing a series of data requests from the configuration server. However, for wireless mesh networks additional bootstrapping parameters, such as for example, transmission channel, or Received Signal Strength Indication (RSSI) threshold; however, other may examples exist. Therefore, in one embodiment the configuration server may include an added action, called for example SetBootstrappingConfiguration( ) or GetBootstrappingConfiguration( ) that sets all the bootstrapping parameters necessary for bootstrapping a wireless network node. The unconfigured device may utilize this action, or a similar action, to configure itself to successfully become part of the existing wireless network. While the description of the embodiment includes the unconfigured device pulling data from the configured device, embodiments are contemplated that include pushing data from the configured device or a combination thereof.

Block 150 illustrates that, in one embodiment, a determination may be made whether or not the previously unconfigured device is properly configured. In one embodiment, this may include rebooting the unconfigured device and seeing if the device properly joins the wireless mesh network. In another embodiment, an internal self-check may be made.

Block 125 illustrates that, in one embodiment, if the unconfigured device is not properly configured an error alert may be issued. While FIG. 1 utilizes the same block for all errors, it is contemplated that different errors may be used. It is also contemplated that some embodiments may exist in which no or only some errors are issued and that other responses to an undesirable result may be performed.

Block 160 illustrates that, in one embodiment, if the previously unconfigured device is now properly configured an indication may be made. In the specific example above, if the unconfigured access point is rebooted and properly joins the wireless mesh network, a LED may indicate that the access point is part of the network.

Figure 2:
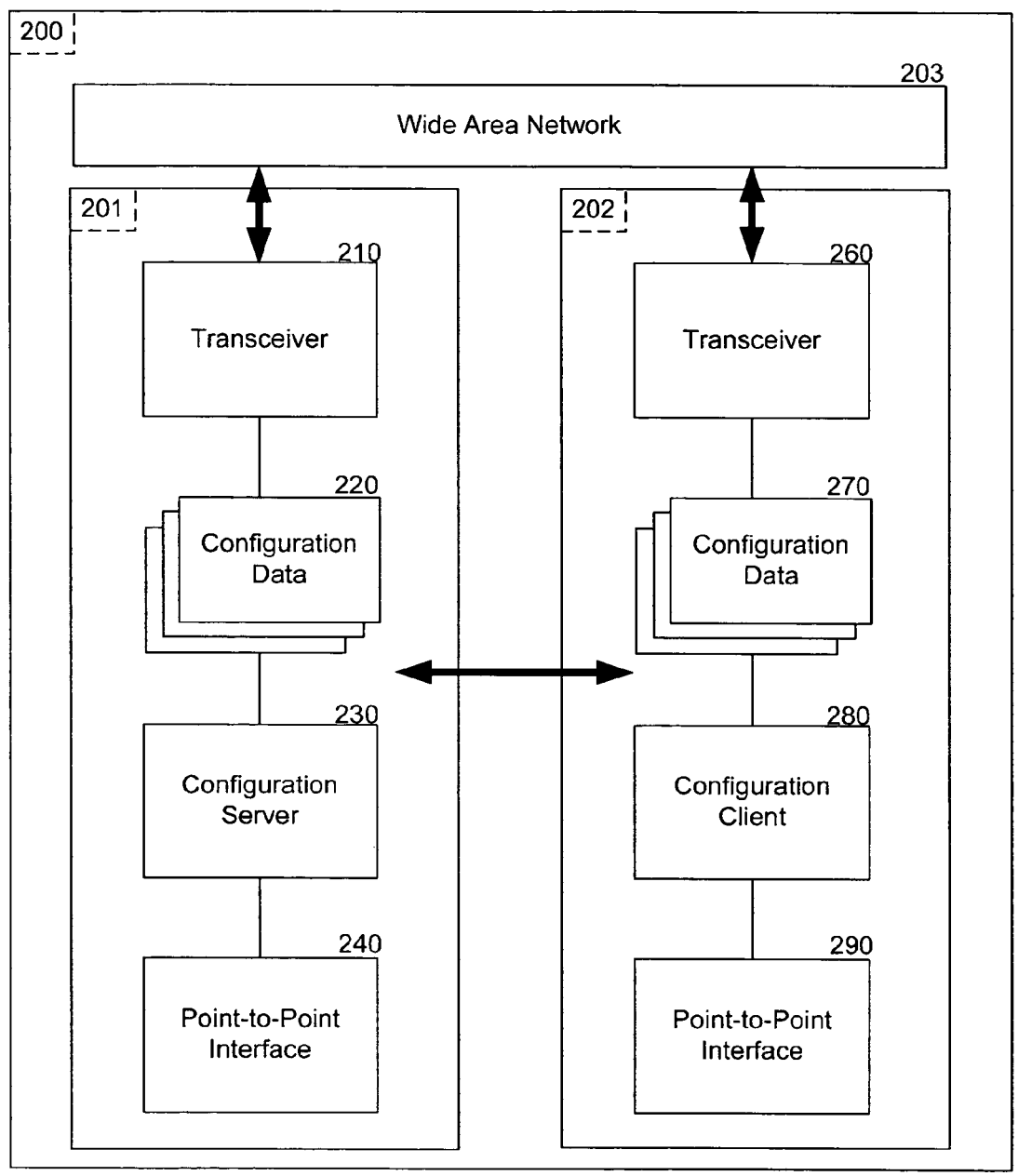
FIG. 2 is a block diagram illustrating an embodiment of a system and apparatus capable of attempting to automatically configure an unconfigured device utilizing a previously configured device.

FIG. 2 is a block diagram illustrating an embodiment of a system 200 and apparatus 201 & 202 capable of attempting to automatically configure an unconfigured device 202 utilizing a previously configured device 201. In one embodiment, the apparatus 201 may include a transceiver 210, a configuration server 230, and configuration data 220. In another embodiment, the apparatus 202 may include a transceiver 260, a configuration client 280, and configuration data 270.

In one embodiment, the transceivers 210 & 260 may be capable of communicating via a wireless network or protocol. In one embodiment, the transceivers may be capable of communicating in a manner which is substantially in compliance with, for example, any standard derived or supplemental to the IEEE 802.11 wireless local area network (WLAN) standard (hereafter, "the 802.11 standard or specification family"). *Standards for Information Technology—Telecommunications and Information Exchange between Systems—Local and Metropolitan Area Network—Specific Requirements—Part II: Wireless LAN Medium Access Control (MAC) and Physical Layer (PHY) Specifications*, ANSI/IEEE Std. 802.11-1999 (hereafter "802.11").

In one embodiment, the configuration server 230 may be capable of supplying the configuration data 220 to the configuration 280. In one embodiment, the configuration server may be capable of performing some or all of the actions described above in relation to FIG. 1, specifically Blocks 110, 120, 130, 140, & 150. In one embodiment, the configuration client may be capable of performing some or all of the actions described above in relation to FIG. 1, specifically Blocks 110, 120, 125, 130, 140, 150 & 160. In one embodiment, an apparatus within the scope of the disclosed subject matter may include both a configuration server and a configuration client, or these two components may be integrated into a single component.

In one embodiment, the apparatus 201 & 202 may include a point-to-point interface 240 & 290, respectively. In one embodiment, this interface may include a wired port, such as for example, an Ethernet port or a custom point-to-point interface. In one embodiment, the point-to-point interfaces may be capable of performing the functions illustrated above in relation to FIG. 1, specifically Blocks 110 & 120. In one embodiment, the point-to-point interfaces may also include that ability to perform the actions illustrated by Blocks 125 & 160.

In one embodiment, the system 200 may include a wide area network 203, a configured apparatus 201 and an unconfigured apparatus 202. These components may be coupled so as to allow the existence of a wireless mesh network. In one embodiment, the components may also be capable of performing the actions illustrated by FIG. 1 and described above.

The techniques described herein are not limited to any particular hardware or software configuration; they may find applicability in any computing or processing environment. The techniques may be implemented in hardware, software, firmware or a combination thereof. The techniques may be implemented in programs executing on programmable machines such as mobile or stationary computers, personal digital assistants, and similar devices that each include a processor, a storage medium readable or accessible by the processor (including volatile and non-volatile memory and/or storage elements), at least one input device, and one or more output devices. Program code is applied to the data entered using the input device to perform the functions described and to generate output information. The output information may be applied to one or more output devices.

Each program may be implemented in a high level procedural or object oriented programming language to communicate with a processing system. However, programs may be implemented in assembly or machine language, if desired. In any case, the language may be compiled or interpreted.

Each such program may be stored on a storage medium or device, e.g. compact disk read only memory (CD-ROM), digital versatile disk (DVD), hard disk, firmware, non-volatile memory, magnetic disk or similar medium or device, that is readable by a general or special purpose programmable machine for configuring and operating the machine when the storage medium or device is read by the computer to perform the procedures described herein. The system may also be considered to be implemented as a machine-readable or accessible storage medium, configured with a program, where the storage medium so configured causes a machine to operate in a specific manner. Other embodiments are within the scope of the following claims.

While certain features of the claimed subject matter have been illustrated and described herein, many modifications, substitutions, changes, and equivalents will now occur to those skilled in the art. It is, therefore, to be understood that the appended claims are intended to cover all such modifications and changes that fall within the true spirit of the claimed subject matter.

The invention claimed is:

1. An article comprising:
a non-transitory machine accessible medium having a plurality of machine accessible instructions, wherein when the instructions are executed, the instructions provide for:
establishing point-to-point communication utilizing a Universal Plug and Play (UPnP) protocol over a secure out-of-band channel between a configured access point having a configuration server, and an unconfigured access point with the unconfigured access point automatically in response to introduction of the unconfigured access point into the wireless mesh network, wherein configuration provides network communication parameters to the unconfigured access point, wherein the secure out-of-band channel comprises a wired point-to-point connection directly between the unconfigured access point and the configured access point, wherein the parameters comprise one or more of a service set identifier (SSID), a channel number, and/or a transmit power level, wherein the access point provides network access to a user device and the unconfigured access point to provide network access to the user device in response to being configured, wherein automatically configuring the unconfigured access point comprises attempting to configure the unconfigured access point such that the access point may operate within the same wireless mesh network as the configured device by making a single request to the configuration server to configure the unconfigured access point that includes an action that allows for setting all the configuration data necessary to bootstrap the unconfigured access point into the wireless mesh network utilizing a variable list of parameters;
discovering a configuration server running on the configured access point with the unconfigured access point via the secure out-of-band channel;
utilizing the configuration server to automatically configure the unconfigured access point; and
communicating over the wireless mesh network with the access point using configuration information from the configuration server.

2. The article of claim 1, wherein the instructions providing for establishing communication includes instructions providing for:
connecting the configured device and unconfigured access point via the wired cable;
detecting the connection; and
detecting that the connection has disconnected and then reconnected.

3. The article of claim 1, further comprising instructions providing for:
determining if the unconfigured access point is properly configured; and
if the access point is not properly configured, providing a physical indication that a proper configuration of the unconfigured access point needs to occur.

4. An apparatus capable of facilitating a wireless mesh network comprising:
a transceiver to communicate via a wireless protocol;
configuration data for facilitating the operation of the apparatus within a wireless network;
a configuration client to:
discovering a configuration server running on a configured access point; and
utilizing the configuration server within the configured access point to automatically configure the apparatus as an access point within the wireless mesh network by providing one or more of a service set identifier (SSID), a channel number, and/or a transmit power level, wherein the access point provides network access to a user device and the unconfigured access point to provide network access to the user device in response to being configured, wherein the configuration client configures the apparatus such that the apparatus may operate within the same wireless mesh network as the configured device, wherein automatically configuring the apparatus includes making a single request to the configuration server to configure the apparatus, wherein the single request includes an action that allows for setting all the configuration data necessary to bootstrap the apparatus into the wireless mesh network utilizing a variable list of parameters;
a wired Ethernet interface to establish point-to-point communication directly between the configuration server and the configuration client utilizing a Universal Plug and Play (UPnP) protocol.

5. The apparatus of claim 4, wherein the point-to-point interface establishes communication by:
connecting the configured device and unconfigured device via a wired cable;
detecting the connection; and
detecting that the connection has disconnected and then reconnected.

6. The apparatus of claim 4, wherein the point-to-point interface establishes communication utilizing a secure out-of-band channel.

7. The apparatus of claim 4, wherein configuration client discovers the configuration server utilizing a protocol compliant with the Universal Plug and Play (UPnP) family of protocols.

8. The apparatus of claim 4, wherein the configuration client further to: determining if the apparatus is properly configured; and if the apparatus is not properly configured, providing a physical indication that a proper configuration of the apparatus needs to occur.

* * * * *